United States Patent Office 3,083,113
Patented Mar. 26, 1963

3,083,113
ZINC OXIDE PIGMENTS AND THEIR
PRODUCTION
Christiaan Korf, Ryswyk, and Fritz H. W. Wachholtz,
Nunspeet, Netherlands, assignors to W. Dorst, Haarlem, Netherlands, a corporation of the Netherlands
No Drawing. Filed Apr. 7, 1960, Ser. No. 20,571
12 Claims. (Cl. 106—254)

This invention relates to a process for chemically coating zinc oxide pigments and to the resulting product.

Pigmentary zinc oxide is known to have a number of very desirable properties, which should render it extensively useful as a white pigment. It is low in cost, has excellent optical properties including superior whiteness, high hiding power and high absorptive power for ultraviolet light, and has mildewcidal activity. Yet zinc oxide has a number of properties which have largely restricted its use as pigments in trade and industrial finishes and for other pigmentary purposes. For example, zinc oxide pigments have high reactivity with organic acids and are substantially incompatible with alkyd resins. Thus conventional paint formulations containing zinc oxide pigment have very limited shelf life and dried protective coatings pigmented with zinc oxide rapidly lose flexibility. For instance, an exterior alkyd paint pigmented with zinc oxide usually checks or cracks, within two years.

The foregoing defects of zinc oxide pigments have been recognized heretofore but efforts to overcome these defects have not been successful. Efforts have been made to chemically coat the zinc oxide pigments in order to overcome their disadvantages while preserving their good properties. For instance, in accordance with United States Patent 2,251,869 zinc oxide pigments are treated with meta- or pyrophosphoric acid, or their alkali salts, in order to chemically coat them with zinc polyphosphate and thereby reduce the reactivity of the pigments and increase their resistance to staining by copper salts and the like. These coatings, however, are quite impermanent for they are not sufficiently stable to moisture which hydrolyzes the polyphosphates.

It is an important object of this invention to provide a zinc oxide pigment which is substantially chemically inert to its environment during storage and use and yet retains its desirable pigmentary properties substantially unimpaired. It is a special object of the invention to provide zinc oxide pigments with a chemically bound molecular coating which preserves and stabilizes the inherent pigmentary properties of the zinc oxide without introducing undesirable pigmentary properties. It is another special object of the invention to provide a zinc oxide pigment having a very thin coating chemically bound which does not impair the optical properties of the pigment. It is a particular object of the invention to provide zinc oxide pigments with a chemically bound non-crystalline thin molecular coating which is insoluble in water and organic solvents conventionally used with pigments. It is another particular object of the invention to provide a simple and efficient process for producing substantially impervious and uniform chemically bound coatings on pigmentary particles of zinc oxide thereby producing zinc oxide pigments having the above noted improved pigmentary characteristics. Other objects and features of the invention will become apparent from the more detailed description which follows.

It has been found that the foregoing and other objects, can be achieved, if zinc oxide pigments are mixed and suspended in an aqueous alkali metal silicate solution with an added acidifying agent which reduces the alkalinity of the solution to a pH of not more than 11 and not less than 7.5. A chemical reaction takes place between the zinc oxide and the alkali metal silicate. The pigment is maintained in a suspended state in the aqueous solution of the alkali metal silicate, as with appropriate agitating devices, until the reaction has taken place. The extent of the reaction can be determined, for example, by the reduction in the concentration of the alkali metal silicate in the aqueous medium and by the amount of flocculation which appears.

Thus the present invention contemplates a chemical reaction between the zinc oxide and the alkali silicate. It has been found that the pH developed by a suspension of zinc oxide in the alkali silicate solution is not conducive to the reaction between the two ingredients for although reaction may take place and a partial coating may be formed after a long period of time, the reaction is incomplete and, as a result, the silica is not effectively utilized and the coating contains alkalis which are undesirable. Yet, in the introduction of the acidic agent, one should be careful to avoid pH's below 7.5 and, especially below 7, for under acidic conditions silica precipitates independently of the zinc oxide and forms a physical mixture of the two having suitably only for use in flat paint. Thus one should be careful to add sufficient amounts of the acidic agent to induce the reaction to take place while being careful to avoid pH's below 7.5. Of course, conventional mineral acids, such as HCl, and inexpensive organic acids constitute an inexpensive source of acidic agents but phosphoric acid and monosodium hydrogen phosphate have proven especially advantageous in the reducing of the pH. Among other things, such acidic substances can be used without developing acidic conditions locally and the pH may be gradually reduced to a pH conducive to the desired reaction without actually converting the solution to an acidic solution having a pH below 7.

Readily available water soluble alkali metal silicates may be used in the process of this invention such as those having a ratio of the $SiO_2$ to the alkali metal oxide of about 2–3.5:1. On adding acid, this ratio may be raised to 6, 10, 20 or more to 1 which ratio is determined by the pH adjustment. For economic reasons, sodium and potassium silicates are preferred and ordinary water glass is quite satisfactory. Wide choice in the alkali metal, or its equivalent, is offered for the alkali metal by-products of the reaction remains in solution.

Any method of suspending the pigmentary zinc oxide in an aqueous solution of the alkali metal silicate may be used provided the alkalinity of the mixture is adjusted to one between 7.5 and 11, the preferred pH value being between 8 and 9. The desired reaction takes place while avoiding hydrogen ion concentrations which cause silica to precipitate. It will be apparent, therefore, that the acidic agent should be added to the aqueous solution under thorough agitation so as to avoid acid conditions in local areas. The pH of the alkali metal silicate solution may be adjusted before the zinc oxide pigment is suspended therein or after the dispersion has taken place. In accordance with a preferred practice, the zinc oxide is first suspended in a dilute alkali metal silicate solution containing only part of the silicate to be used to coat the pigment so as to thoroughly wet the pigmentary particles and additional silicate and acid agent added thereafter. In this way, the zinc oxide is easily wetted and slurries containing 40–45% zinc oxide are obtained. The acidic agent needed to make the necessary adjustment in the pH of the ultimate aqueous reaction mass may be added to the additional silicate solution before it is added to the aqueous suspension of the zinc oxide or it may be added conjointly or afterward. The acidic substance should not be added to an aqueous suspension of the pigment in the absence of the alkali metal silicate for the acid, or other acid substance may form zinc salts of the acid substance which are undesirable.

The amount of $SiO_2$ equivalent used in the form of the alkali metal silicate solution should be at least 0.5-1% of the dry weight of the zinc oxide. Since the silica can be almost completely exhausted from the solution at appropriate pH's, such a solution will provide zinc oxides containing at least 0.5% of $SiO_2$ bound as zinc silicate. The total amount of $SiO_2$ used would normally be 3-5% if complete stability to fatty acids under humid conditions are desired. On the other hand, 0.5 to 1% $SiO_2$ is sufficient to impart a considerable improvement in exterior paints pigmented with zinc oxide. The use of $SiO_2$ in quantities above 5%, say in amounts of 20-25%, is possible but no particular advantage is achieved thereby and the inherent pigmentary characteristics of the zinc oxide may be impaired.

In order to permit the reaction to take place, the dispersion of the pigment in the aqueous solution of the silicate, with the adjusted pH, is stirred for 10 to 60 minutes. Sometimes it is desirable to heat the pigment slurry to 60 to 80° C., or even to boiling, to speed the reaction. In this way, the reaction of the pigment with the silicate is more nearly complete and less soluble silicate salts will remain in solution. It will be understood, however, that a zinc silicate coating will be formed at room temperature provided the pigment is maintained in the solution for a sufficiently long period of time.

Storage of the solution for several hours after the stirring has been discontinued facilitates the separation of the pigment from the aqueous reaction media. The pigment may be separated readily and easily in a conventional manner as by simple sedimentation, by use of a filter press or by centrifuging. The coated and separated pigment is customarily dried at 100 to 200° C.

The pigment may be washed before drying in order to remove water soluble contaminants such as entrained alkali metal silicates which may impart undesired alkalinity to the pigment but washing is not strictly necessary.

The reaction conditions including, temperature, time and pH determine the proportions of the silica of the alkali metal silicate which will become chemically bound to the pigment. Under proper conditions, 95% of the $SiO_2$ becomes transferred to the pigment.

It has been found that an acceptable pigment can be obtained when the ratio of alkali oxide to $SiO_2$ in the chemically bound coating hereof is as high as 1:10. Yet, in accordance with this invention, coating containing half as high a content of alkali may be readily obtained. As stated above, the alkalinity of the treated pigments, if any, can be reduced by thorough washing.

It is recognized that certain white pigments have been conjointly precipitated with silica from silicate solutions by acidifying the solutons to pH's of 6, and below, in order to provide a mixture of pigments for use in flat paints. It is stated that such pigments have improved oil absorptive properties and impart improved hiding power to flat paints. Such pigments are not suitable for use in gloss paints and such a process will not achieve the objectives of this invention.

In the light of the foregoing disclosure, the significance of the invention and its scope will become apparent from the following illustrative examples of preferred ways of practicing the invention.

EXAMPLE 1

One thousand (1000) gr. zinc oxide was slowly added under agitation to 18 gr. of a sodium silicate solution, of 41° Bé., diluted with water to 1000 cc. This solution contained 5 gr. $SiO_2$ in the molar ratio $SiO_2:Na_2O=3.1:1$. Agitation was continued for one hour to obtain complete dispersion of the pigment. To this suspension, 118 gr. of a sodium silicate solution of 41° Bé. was added containing 33 gr. $SiO_2$ and 30 gr. monosodium phosphate ($NaH_2PO_4.H_2O$) diluted with water to 1500 cc. It was prepared by adding the sodium phosphate solution in water to a sodium silicate solution with molar ratio $SiO_2:Na_2O=3.1:1$. The suspension thickened slightly. After 2-3 hours, the reaction had proceeded sufficiently and the pigment had separated. The excess of water was filtered off and the pigment was washed with water to remove last traces of soluble salts. Then the pigment was dried at 100-150° C.

While washing the pigment is desirable, it is not necessary.

EXAMPLE 2

Fifty (50) parts by weight of the pigment of Example 1 were thoroughly milled with 35 parts by weight of bodied linseed oil (20 poises at 20° C.). The resulting paste was thinned with 15 parts of mineral spirits containing 1-2 parts of a paint drier. Upon application as a surface coating, the paint dried to a high gloss and the coating was very flexible and durable.

The degree of stability of pigments prepared in the manner of Example 1 was evaluated in a known way by mixing the pigment with bodied linseed oil (300 poises at 20° C. and having an acid value 25) dissolved in mineral spirits (60% solids) in ratio 1 part of zinc oxide:2 parts of oil solution. The degree of thickening is expressed in the scale 1–10, 1 being unchanged, 10 being completely solidified. The number of hours to reach these degrees is noted. The following examples further illustrate the invention and an evaluation of the stability of the pigment.

*Table 1*

| Example | Ratio, $SiO_2:Na_2O$ | Gram $SiO_2$ per 100 gr. ZnO | | pH sil. sol. used | Degree of reactivity (hours) | pH adj. with— |
|---|---|---|---|---|---|---|
| | | Added | Bound | | | |
| 3 | 6.5:1 | 5.7 | 5.4 | 10 | 1 (40) | HCl |
| 4 | 6.5:1 | 3 | | 10 | 1 (40) | $H_3PO_4$ |
| 5 | 6.5:1 | 3 | | 10 | 1 (40) | $NaH_2PO_4$ |

The results of Table 1 may be compared with the results following from the use of untreated pigments where 10 on the scale was reached after only 17 hours.

Stability of the same compositions upon being applied as a coating and exposed to humid air is shown in Table 2.

*Table 2*

| Example | Ratio, $SiO_2:Na_2O$ | Gram $SiO_2$ per 100 gr. added | Degree of reactivity (hours) | pH adj. with— |
|---|---|---|---|---|
| 6 | 6.5:1 | 3 | 6 (40) | HCl |
| 7 | 6.5:1 | 3 | 6 (40) | 3% $H_3PO_4$ |
| 8 | 6.5:1 | 3 | 2 (40) | $NaH_2PO_4$ |

The results of Table 2 may be compared with the results achieved when the same pigmentary ZnO was treated with 3% $H_3PO_4$ where 9 on the scale was reached in 17 hours.

Equivalent results are obtained with corresponding potassium silicates.

Other evaluation tests confirm that improvements in technical properties had definitely been obtained. Exterior durability of a zinc oxide coated with only 0.5% $SiO_2$ was found to be greatly superior to uncoated zinc oxide. Loss of flexibility was also greatly reduced. On the other hand, it was found that no loss in fungicide activity could be detected.

The improvement in a zinc pigment coated with only 0.5% $SiO_2$ was observed by measuring the flexibility of a paint film in the well-known Erichsen apparatus in mm. impression before the paint coating cracked. One paint contained uncoated and the other zinc oxide coated with 0.5% $SiO_2$. The Erichsen impression of the dried paint films was determined before outside exposure and after 2 and 6 months. The results are set out below.

*Erichsen Impressions*

| Time in months | Impressions in mm. | |
| --- | --- | --- |
| | Coated | Uncoated |
| 0 | 8 | 8 |
| 2 | 6 | 3 |
| 6 | 3 | 1 |

It will be apparent to those skilled in the art from the foregoing disclosure that the specific alkali metal silicates and the proportions thereof relative to the amount of zinc oxide and the specific acidic agents used to adjust the alkalinity of the reaction media, and other process details, may be widely varied and still fall within the scope of the invention as taught herein and as defined in the appended claims.

What is claimed is:

1. A zinc oxide pigment product, the particles of which are coated with zinc silicate in a quantity corresponding to 0.5–20% $SiO_2$ based on the weight of the dry pigment, said product being formed by the reaction of zinc oxide and an alkali metal silicate suspended in an aqueous medium at a pH between 7.5 and 11.

2. A zinc oxide pigment product, the particles of which are coated with zinc silicate in a quantity corresponding to 0.5–20% $SiO_2$ based on the weight of the dry pigment, formed and reacted on the surface of said particles, said product being formed by the reaction of zinc oxide and an alkali metal silicate suspended in an aqueous medium at a pH between 7.5 and 11.

3. A zinc oxide pigment product, the particles of which are coated with zinc silicate in a quantity corresponding to 0.5–5% $SiO_2$ based on the weight of the dry pigment, said product being formed by the reaction of zinc oxide and an alkali metal silicate suspended in an aqueous medium at a pH between 7.5 and 11.

4. A zinc oxide pigment product, the particles of which are coated with zinc silicate reacted on the surfaces of said particles, the quantity of the zinc silicate on the surfaces corresponding to 0.5–5% $SiO_2$ based on the weight of the dry pigment, said product being substantially free of precipitated silica particles and being formed by the reaction of zinc oxide and an alkali metal silicate suspended in an aqueous medium at a pH between 7.5 and 11.

5. A process for forming a zinc oxide pigment product of increased inertness in coating compositions which comprises, mixing zinc oxide pigment with an aqueous alkali metal silicate solution and with an acidic agent in a quantity reducing the alkalinity of the solution to a pH between 7.5 and 11 at which the zinc oxide reacts with said alkali metal silicate, maintaining the pigment in the solution until reaction has occurred and a coating of zinc silicate has formed on the surfaces of the particles in a quantity corresponding to 0.5–20% $SiO_2$ based on the weight of the dry pigment, removing residual solution and drying the coated pigment formed.

6. A process for forming a zinc oxide pigment product of increased inertness in coating compositions which comprises, mixing zinc oxide pigment with an aqueous alkali metal silicate solution and with an acidic agent reducing the alkalinity of the solution to a pH between 8 and 9 at which the zinc oxide reacts with said alkali metal silicate, said alkali metal silicate having a silicon oxide to metal oxide ratio of at least 3:1, maintaining the pigment in the solution until reaction has occurred and a coating of zinc silicate has formed on the surfaces of the particles in a quantity corresponding to 0.5–20% $SiO_2$ based on the weight of the dry pigment, removing residual solution and drying the coated pigment formed.

7. A process for forming zinc oxide pigment products of increased stability in coating compositions which comprises mixing zinc oxide pigment with a part of the total quantity of an aqueous alkali metal silicate solution to be used in the herein specified process thereby completely wetting the surfaces of the pigment particles with the silicate solution, mixing with the resulting mass the remaining quantity of the alkali metal silicate solution and with an acidic agent in a quantity imparting to the reaction mixture a pH value between 7.5 and 11 which causes reaction between the zinc oxide and the alkali metal silicate, maintaining the pigment in the solution until the reaction has occurred and a coating of zinc silicate has formed on the surfaces of the particles in a quantity corresponding to 0.5–20% $SiO_2$ based on the weight of the dry pigment, removing residual solution and drying the coated pigment formed.

8. A process for forming zinc oxide pigment products of increased stability in coating compositions which comprises mixing zinc oxide pigment with a part of the total quantity of an aqueous alkali metal silicate solution to be used in the herein specified process thereby completely wetting the surfaces of the pigment particles with the silicate solution, said alkali metal silicate having a silicon oxide to metal oxide ratio between 1.85:1 and 6.5:1, mixing with the resulting mass the remaining quantity of the alkali metal silicate solution and with an acidic agent in a quantity imparting to the reaction mixture a pH value between 7.5 and 11 which causes reaction between the zinc oxide and the alkali metal silicate, maintaining the pigment in the solution until the reaction has occurred and a coating of zinc silicate has formed on the surfaces of the particles in a quantity corresponding to 0.5–20% $SiO_2$ based on the weight of the dry pigment, removing residual solution and drying the coated pigment formed.

9. A process for forming zinc oxide pigment products of increased stability in coating compositions which comprises mixing zinc oxide pigment with a part of the total quantity of an aqueous alkali metal silicate solution to be used in the herein specified process thereby completely wetting the surfaces of the pigment particles with the silicate solution, mixing with the resulting mass an additional quantity of the alkali metal silicate solution sufficient to coat the zinc oxide with 0.5 to 5% by weight of silica and with an acidic agent in a quantity imparting to the reaction mixture a pH value between 7.5 and 11 which causes reaction between the zinc oxide and the alkali metal silicate, maintaining the pigment in the solution until the reaction has occurred and a coating of zinc silicate has formed on the surfaces of the particles, removing residual solution and drying the coated pigment formed.

10. A process for forming zinc oxide pigment products of increased stability in coating compositions which comprises mixing zinc oxide pigment with a part of the total quantity of an aqueous alkali metal silicate solution to be used in the herein specified process thereby completely wetting the surfaces of the pigment particles with the silicate solution, mixing with the resulting mass the remaining quantity of the alkali metal silicate solution and with phosphoric acid in a quantity imparting to the reaction mixture a pH value between 7.5 and 11 which causes reaction between the zinc oxide and the alkali metal silicate, maintaining the pigment in the solution until the reaction has occurred and a coating of zinc silicate has formed on the surfaces of the particles in a quantity corresponding to 0.5–20% $SiO_2$ based on the weight of the dry pigment, removing residual solution and drying the coated pigment formed.

11. A process for forming zinc oxide pigment products of increased stability in coating compositions which comprises mixing zinc oxide pigment with a part of the total quantity of an aqueous alkali metal silicate solution to be used in the herein specified process, thereby completely wetting the surfaces of the pigment particles with the silicate solution, mixing with the resulting mass the remaining quantity of the alkali metal silicate solution and with monosodium acid phosphate in a quantity imparting to the reaction mixture a pH value between 7.5 and 11 which causes reaction between the zinc oxide and the alkali metal silicate, maintaining the pigment in the solution until the reaction has occurred and a coating of zinc silicate has formed on the surfaces of the particles in a quantity corresponding to 0.5–20% $SiO_2$ based on the weight of the dry pigment, removing residual solution and drying the coated pigment formed.

12. A gloss paint having a vehicle reactive with conventional zinc oxide selected from the group consisting of drying oils and alkyd resin binders, said paint having therein a zinc oxide pigment product, the particles of which are coated with zinc silicate in a quantity corresponding 0.5–20% $SiO_2$ based on the weight of the dry pigment, said product being formed by the reaction of zinc oxide and an alkali metal silicate suspended in an aqueous medium at a pH between 7.5 and 11.

References Cited in the file of this patent
UNITED STATES PATENTS

| | | |
|---|---|---|
| 2,237,374 | Smith | Apr. 8, 1941 |
| 2,296,636 | Hanahan | Sept. 22, 1942 |
| 2,958,578 | Baker et al. | Nov. 1, 1960 |